United States Patent [19]

Mikami et al.

[11] Patent Number: 5,432,218
[45] Date of Patent: Jul. 11, 1995

[54] ROOM-TEMPERATURE-CURABLE ORGANOPOLYSILOXANE COMPOSITION

[75] Inventors: Ryuzo Mikami; Hisataka Nakashima; Tadashi Okawa; Shigeki Sugiyama, all of Chiba, Japan

[73] Assignee: Dow Corning Toray Silicon Co., Ltd., Tokyo, Japan

[21] Appl. No.: 246,894

[22] Filed: May 20, 1994

[30] Foreign Application Priority Data

May 25, 1993 [JP] Japan .................. 5-145717

[51] Int. Cl.6 .............. C08K 5/54; C08K 5/09
[52] U.S. Cl. ..................... 524/262; 524/264; 524/268; 524/425; 524/588; 524/731; 524/788; 524/860; 524/862; 524/863; 528/41
[58] Field of Search ............ 528/41; 524/588, 425, 524/268, 860, 862, 863, 788, 731, 262, 264

[56] References Cited

U.S. PATENT DOCUMENTS

| | | | |
|---|---|---|---|
| 3,719,365 | 3/1973 | Clark et al. | 260/46.56 |
| 4,447,576 | 5/1984 | Fukayama et al. | 524/714 |
| 4,683,251 | 7/1987 | Mikami | 522/46 |
| 4,978,363 | 12/1990 | Ona et al. | 8/581 |

FOREIGN PATENT DOCUMENTS

210442  4/1987  European Pat. Off.

OTHER PUBLICATIONS

Japanese Abstract J49002853, Jan. 11, 1974.

*Primary Examiner*—John C. Bleutge
*Assistant Examiner*—Karen A. Dean
*Attorney, Agent, or Firm*—Roger H. Borrousch

[57] ABSTRACT

The introduction of a room-temperature-curable organopolysiloxane composition that cures at room temperature to give a rubber whose surface is easily coated with paint and from which the resulting paint film does not delaminate readily and that after curing is free from staining of the surface of the rubber and any substrates in contact with the rubber.

17 Claims, No Drawings

ROOM-TEMPERATURE-CURABLE ORGANOPOLYSILOXANE COMPOSITION

BACKGROUND OF THE INVENTION

1. Technical Field

The present invention relates to a room-temperature-curable organopolysiloxane composition. More specifically, the present invention relates to a room-temperature-curable organopolysiloxane composition that cures at room temperature into a rubber whose surface is easily coated with paint to yield a delamination-resistant paint film. Moreover, after curing, staining of the surface of the rubber or any substrate ajacent to the rubber does not occur with this room-temperature-curable organopolysiloxane composition.

2. Prior Art and Problems to Be Solved by the Invention

Organopolysiloxane compositions that cure at room temperature to form rubber are used in a wide range of applications, for example, as sealants, electrical insulating materials, adhesives, moldmaking materials, and so forth. One example already known in this regard is comprised of compositions prepared from silanol-endblocked organopolysiloxane plus crosslinker that contains silicon-bonded hydrolyzable groups in Japanese Patent Application Laid Open (Kokai or Unexamined) Number Sho 48-15962 (15,962/1973), equivalent to U.S. Pat. No. 3,719,635, issued Mar. 6, 1973 to Clark et al and Japanese Patent Application Laid Open Number Sho 49-2853 (2,853/1974) and assigned to Shinetsu Chemical Ind. Co.

However, compositions of this type exhibit a poor paint coatability, and the application of paint to the surface of the cured rubber is highly problematic. In addition, after curing, staining gradually occurs on the surface of the rubber and on substrates adjacent to the rubber. A room-temperature-curable organopolysiloxane composition containing amino-functional alcohol has already been proposed with the goal of improving the paint coatability in Japanese Patent Application Laid Open Number Sho 58-215453 (215,453/1983) equivalent to U.S. Pat. No. 4,447,576, issued May 8, 1984, to Fukayama et al. While this composition does exhibit good paint coatability to some degree, the adherence to the paint is unsatisfactory, which ultimately results in delamination or peeling of the paint film. In order to eliminate the other problem described above (staining of the surface of the cured rubber and substrates adjacent to the rubber), the present inventors have already proposed room-temperature-curable organopolysiloxane compositions that contain drying oil Japanese Patent Application Laid Open Number Sho 62-1750 (1,750/1987) assigned to Toray Silicone KK equivalent to European Patent Publication No. 210,442, and Japanese Patent Application Laid Open Number Sho 62-7763 (7,763/1987) equivalent to U.S. Pat. No. 4,683,251, issued Jul. 28, 1987, to Mikami. These compositions exhibit excellent anti-staining properties, but the drying oil can separate during storage and the surface of the cured rubber can become discolored.

Ona et al in U.S. Pat. No. 4,978,363, issued Dec. 18, 1990, describe a reaction product of an organopolysiloxane having at least one amino-substituted hydrocarbon radical bonded to a silicon atom and a higher fatter carboxylic acid. The carboxylic acids can be either saturated or unsaturated. These reaction products are used as fiber-treatment that does not gel during use.

SUMMARY OF THE INVENTION

The present invention takes as its object a room-temperature-curable organopolysiloxane composition that cures into a rubber whose surface is easily coated with paint to yield a delamination-resistant paint film, that after curing is free of soiling or staining of the surface of the rubber or any substrate adjacent to the rubber, and that is particularly useful as a sealant.

The present invention relates to a room-temperature-curable organopolysiloxane composition comprising (A) 100 weight parts essentially linear organopolysiloxane that has a silanol group or a silicon-bonded hydrolyzable group at its molecular chain terminals and has a viscosity at 25° C. of from 0.1 to 1,000 Pa.s, (B) 0.1 to 40 weight parts silicon-containing crosslinker having at least two silicon-bonded hydrolyzable groups per molecule, and (C) 0.1 to 200 weight parts of the reaction product from an unsaturated fatty acid containing at least 3 carbons and polydiorganosiloxane that contains in each molecule at least 1 silicon-bonded organic group selected from the group consisting of amino-functional organic groups and epoxy-functional organic groups.

DETAILED DESCRIPTION OF THE PREFERRED EMBODIMENTS

Component (A) of the present invention is an organopolysiloxane and the main or base component of the inventive composition. It carries a silanol group or a silicon-bonded hydrolyzable group at its molecular chain terminals. The silicon-bonded hydrolyzable group is exemplified by acyloxy groups such as acetoxy, octanoyloxy, and benzoyloxy; ketoximo groups such as the dimethyl ketoximo group, the methyl ethyl ketoximo group, and the diethyl ketoximo group; alkoxy groups such as methoxy, ethoxy, and propoxy; alkenyloxy groups such as isopropenyloxy and 1-ethyl-2-methylvinyloxy; amino groups such as dimethylamino, diethylamino, butylamino, and cyclohexylamino; aminoxy groups such as dimethylaminoxy; and amido groups such as the N-methylacetamido group, N-ethylacetamido group, and N-methylbenzamido group. This component is essentially linear, which means that it is either linear in its entirety or a portion is branched. The silicon-bonded organic groups present in addition to the silanol or silicon-bonded hydrolyzable groups are exemplified by alkyl groups such as methyl, ethyl, propyl, and butyl; cycloalkyl groups such as cyclopentyl and cyclohexyl; alkenyl groups such as vinyl and allyl; aryl groups such as phenyl, tolyl, and naphthyl; aralkyl groups such as 2-phenylethyl; and groups obtained by replacing all or part of the hydrogen in the preceding organic groups with halogen. The preferred silicon-bonded organic groups are preferably methyl. The instant component has a viscosity at 25° C. of 0.1 to 1,000 Pa.s and preferably of 1 to 100 Pa.s. At viscosities less than 0.1Pa.s, the cured rubber is brittle and does not exhibit good properties. At viscosities exceeding 1,000 Pa.s, the viscosity of the inventive composition is too high and its processing characteristics (workability) are therefore poor. The component under consideration may also be a mixture of two or more organopolysiloxanes of different types or different molecular weights.

The crosslinker of the component (B) brings about curing of the inventive composition through its condensation reaction with component (A). Those crosslinkers already known for use with room-temperature-curable organopolysiloxane compositions can be used as component (B), and they contain at least 2 silicon-bonded hydrolyzable groups in each molecule. The molecular structure can be that of a silane or siloxane, and in the case of siloxanes the molecular structure can be straight chain, branched, or cyclic. The silicon-bonded hydrolyzable groups in this case are exemplified by acyloxy groups such as acetoxy, octanoyloxy, and benzoyloxy; ketoximo groups such as the dimethylketoximo group, the methylethylketoximo group, and the diethylketoximo group; alkoxy groups such as methoxy, ethoxy, and propoxy; alkenyloxy groups such as isopropenyloxy and 1-ethyl-2-methylvinyloxy; amino groups such as dimethylamino, diethylamino, butylamino, and cyclohexylamino; aminoxy groups such as dimethylaminoxy; and amido groups such as the N-methylacetamido group, N-ethylacetamido group, and N-methylbenzamido group. The silicon-bonded organic groups present in addition to the silicon-bonded hydrolyzable groups are exemplified by alkyl groups such as methyl, ethyl, propyl, and butyl; cycloalkyl groups such as cyclopentyl and cyclohexyl; alkenyl groups such as vinyl and allyl; aryl groups such as phenyl, tolyl, and naphthyl; aralkyl groups such as 2-phenylethyl; and groups obtained by replacing all or part of the hydrogen in the preceding organic groups with halogen.

Component (B) is exemplified by the following: methyltrimethoxysilane, methyltriethoxysilane, vinyltrimethoxysilane, methylphenyldimethoxysilane, 3,3,3-trifluoropropyltrimethoxysilane, methyltriacetoxysilane, vinyltriacetoxysilane, phenyltripropionoxysilane, ethyltris(N,N-diethylamino)silane, vinyltris(N-methyl-N-cyclohexylamino)silane, dimethylbis(N,N-dibutylamino)silane, methyltris(N-methylacetamido)silane, methylvinylbis(N-ethylacetamido)silane, vinyltris(N-ethylacetamido)silane, methyltris(N,N-diethylaminoxy)silane, phenyltris(N,N-diethylaminoxy)silane, methyltris(methylethylketoximo)silane, vinyltris(methylethylketoximo)silane, 3,3,3-trifluoropropyltris(methylethylketoximo)silane, methyltris(isopropenoxy)silane, vinyltris(isopropenoxy)silane, ethylpoly-silicate, n-propylorthosilicate, dimethyltetraacetoxydisiloxane, pentamethyltris(N,N-diethylaminoxy)cyclotetrasiloxane, and hexamethylbis(N,N-diethylaminoxy)cyclotetrasiloxane.

Component (B) is added at 0.1 to 40 weight parts per 100 weight parts component (A) and preferably at 1 to 20 weight parts per 100 weight parts component (A). At less than 0.1 weight parts, the inventive composition has a strong tendency to gel during preparation and storage. Moreover, the cure is unsatisfactory and a rubber having the desired properties is not obtained. On the other hand, at more than 40 weight parts, one encounters considerable shrinkage during cure, a very slow cure, and a decline in the elasticity of the cured rubber. Mixtures of two or more types of crosslinkers can be used as component (B).

Component (C) of the present invention is the reaction product of a polydiorganosiloxane and unsaturated fatty acid, and imparts paint coatability and prevents staining or soiling of the surface of the cured rubber and substrates adjacent to the rubber. Because the principal skeleton of this component is polysiloxane, it is highly compatible with component (A) and separation does not occur during the course of storage of the inventive composition. Component (C) is a compound in which an aliphatically unsaturated group has been introduced onto a siloxane skeleton through an amide, carboxylate, or ester bond formed by the reaction of the carboxyl group in the unsaturated fatty acid and the amino or epoxy group in the polydiorganosiloxane. In order to reduce the amount of free unsaturated fatty acid at this point, the number of moles of amino or epoxy group in the polydiorganosiloxane preferably equals or exceeds the number of moles of unsaturated fatty acid. In addition, this reaction is preferably run at temperatures of at least 100° C. Component (C) preferably has a viscosity at 25° C. of 0.001 to 200 Pa.s and more preferably of 0.005 to 15 Pa.s. Component (C) is added at 0.1 to 200 weight parts per 100 weight parts component (A), preferably in an amount of from 5 to 50 weight parts of (C) per 100 weight parts of (A). An addition below 0.1 weight parts cannot impart the desired paint coatability and staining resistance, while an addition in excess of 200 weight parts causes a decline in the properties of the cured rubber.

The polydiorganosiloxane that is one ingredient of component (C) contains in each molecule at least 1 silicon-bonded organic group selected from the group consisting of amino-functional organic groups and epoxy-functional organic groups. These organic groups can be bonded in terminal or non-terminal position or at both positions. The amino group in the amino-functional organic group is preferably a secondary amino group from the standpoint of resistance to discoloration. The silicon-bonded organic groups present in addition to the above-described silicon-bonded organic groups are exemplified by alkyl groups such as methyl, ethyl, and hexyl; haloalkyl groups such as 3,3,3-trifluoropropyl and 3-chloropropyl; aryl groups such as phenyl and naphthyl; and alkenyl groups such as vinyl and allyl. Methyl preferably are at least 70% of this latter category of organic groups. In addition, the polydiorganosiloxane preferably does not contain the silanol group. This is because bonding with component (A) or (B) occurs very readily when the subject polydiorganosiloxane contains silanol, with the result that the effects of this component will not appear. The synthesis of the subject polydiorganosiloxane for the case of silicon-bonded amino-functional organic groups is exemplified as follows:

(a) the platinum-catalyzed addition reaction of N-tert-butylallylamine to tetramethyltetracyclosiloxane;

(b) hydrolysis of the amino-containing dimethoxysilane of the formula

and equilibration polymerization of the resulting hydrolyzate with polydimethylsiloxane and octamethylcyclotetrasiloxane in the presence of an equilibration-polymerization catalyst; and (c) the polymerization of octamethylcyclotetrasiloxane in the presence of bis(3-aminopropyl)tetramethyldisiloxane (=compound having the amino group at both terminals) in Japanese Patent Publication Number Hei 3-51730 (51,730/1991) assigned to Imanishi.

The synthesis of the subject polydiorganosiloxane for the case of silicon-bonded epoxy-functional organic groups is exemplified as follows:

(a) the platinum-catalyzed addition reaction of allyl glycidyl ether to dimethylsiloxane-methylhydrogensiloxane copolymer; and (b) equilibration in the presence of a strong base between 4-epoxycyclohexylethylene and dimethylsiloxane-methylhydrogen-siloxane copolymer in Japanese Patent Publication Number Sho 51-33839 (33,839/1976), assigned to Union Carbide Corp. and equivalent to British Patent No. 1,428,549, published Mar. 17, 1976 and assigned to Union Carbide Corporation.

The unsaturated fatty acid that is the other ingredient used to make component (C) should contain at least 3 carbons, but preferably contains at least 10 carbons in order to generate a particularly desirable paint coatability and staining resistance. The subject unsaturated fatty acids are exemplified by drying oil fatty acids such as soy oil fatty acids, linseed oil fatty acids, tall oil fatty acids, dehydrated castor oil fatty acids, and tung oil fatty acids. The constituents of these drying oil fatty acids are oleic acid, linoleic acid, linolenic acid, eleostearic acid, licanic acid, and their mixtures.

The inventive composition comprises components (A)–(C) as described above, but may contain a cure-accelerating catalyst in addition to these components. Said catalyst is exemplified by the metal salts of carboxylic acids, such as dibutyltin diacetate, dibutyltin dioctoate, dibutyltin dilaurate, cobalt naphthoate, tin octoate, iron octoate, and manganese octoate; metal alcoholates such as tetrabutyl titanate, tetraisopropyl titanate, diisopropyl bis(acetylacetonyl)titanate, and tetrabutyl zirconate; and amine compounds such as guanidine. The following, for example, may also be added on an optional basis to the inventive composition as long as the object of the present invention is not impaired: fillers such as fumed silica, hydrophobicized fumed silica, hydrophobicized precipitated silica, microparticulate quartz, diatomaceous earth, calcium carbonate, and carbon black; pigments such as iron oxide red, titanium dioxide, zinc white, ultramarine blue, iron black, and carbon black; as well as fluidity control agents, antimolds, organic solvents, surfactants, adhesion promoters, and flame retardants. The filler, if present, has as its preferred amount, 5 to 150 weight parts per 100 weight parts of (A).

The inventive composition is prepared by mixing components (A), (B), and (C) and any other optional components in a mixer. Defoaming is preferably carried out during or after mixing.

Paints of various types can be easily coated on the surface of the rubbery elastic material afforded by the cure of the inventive composition as described above, and the resulting paint films do not delaminate readily. In addition, after curing, staining does not occur on the surface of the rubber or on substrates adjacent to the rubber. Furthermore, component (C) does not separate from the inventive composition during storage, and the surface of the cured rubber from this composition does not discolor. As a result, the inventive composition is highly qualified as a sealant for the seams or joints in exterior building walls that must be painted after sealant application and as a sealant where it is necessary to avoid staining on the surface of the cured rubber and any substrates adjcaent to the rubber.

The invention is explained in detail below through reference, working, and comparison examples. The viscosity is the value at 25° C. unless reported otherwise. The paint coatability test, paint adherence test, and stain resistance test referenced in the examples and comparison examples were carried out as reported below, and the physical properties referenced in the examples and comparison examples were measured as reported below. With regard to the paints used in the paint coatability test and paint adherence test, paint A was an acrylic resin emulsion paint and paint B was an alkyd resin paint. "Part" or "Parts" represent "weight part" or "weight parts" respectively.

Paint Coatability Test

The room-temperature-curable organopolysiloxane composition was cured at room temperature to give a rubber sheet with a thickness of 2.5 mm. Paint was then applied a single time with a brush over a 5 cm×5 cm area on the surface of the rubber sheet, and cissing and crawling phenomena in the paint were then visually evaluated. A score of "++" was assigned when the paint could be uniformly coated over the total surface; a score of "+" was assigned when 50% to 90% of the total surface could be coated; and a score of "x" was assigned when no more than 40% of the total surface could be coated.

Paint Adherence Test

The procedure in the paint coatability test was first executed (multiple applications were carried out by brush in the case of rubber sheet on which the paint was not uniformly coated over the total surface; coating was continued until the paint had been uniformly coated on the total surface to the greatest extent possible). After confirming a thorough curing of the paint film, cellophane tape (width=18 mm) was applied to the paint film. This tape was then peeled off and the nature of paint film delamination was visually evaluated. An excellent adherence between the paint film and rubber sheet was rated as "++" while peeling off with almost no resistance was rated as "x".

Stain Resistance Test

Two white ceramic boards were abutted to form a joint with a width of 20 mm and a depth of 10 mm, and the room-temperature-curable organopolysiloxane composition was filled into this joint. Curing for 1 week at room temperature afforded the test panel. The development of stains on the surface of the cured rubber and on the ceramic boards adjacent to the joint was investigated over a 3-month period by placing the test panel outdoors at a 75° inclination with the joint facing up. The absence of staining was rated as "++" while the development of substantial staining was rated as "x".

Physical Properties

The room-temperature-curable organopolysiloxane composition was placed in a molding frame and cured by standing for 7 days at 20° C. and 55% humidity to yield a rubber sheet with a thickness of 2 mm. The physical properties (hardness, elongation, tensile strength) of this rubber sheet were measured according to JIS K 6301. The hardness was measured using a JIS type A hardness tester.

REFERENCE EXAMPLE 1

Into a 0.5 L flask equipped with stirrer, reflux condenser, thermometer, and addition funnel were introduced 180.6 g N-tert-butylallylamine and sufficient chloroplatinic acid/1,3-divinyltetramethyldisiloxane complex (platinum catalyst) to provide 10 ppm platinum metal referred to the N-tert-butylallylamine. After the resulting mixture was heated to 80° C., 77.0 g tetramethyltetracyclosiloxane was dripped in over a 2 hour period. The reaction was continued for 3 hours at 80° C.–136° C. after the completion of the addition. When this reaction product was submitted to gas chromatography (GLC), it was found that the mono-, di-, and triadducts of the N-tert-butylallylamine were present (1,3,5,7-tetramethyl-1-tert-butylaminopropylcyclotetrasiloxane, 1,3,5,7-tetramethyl-1,3-di(tert-butylaminopropyl)cyclotetrasiloxane, 1,3,5,7-tetramethyl-1,3,5-tri(tert-butylaminopropyl)cyclotetrasiloxane). An additional 7.5 ppm of the same platinum catalyst as described above was therefore added and heating was carried out for another 2 hours at 136° C. Another determination by GLC after this heating showed that the above-mentioned low-molecular-weight compounds had disappeared and the reaction was therefore completed. The unreacted N-tert-butylallylamine and impurities were distilled off in a vacuum first at 35° C./5600 Pa and then at 200° C./400 Pa to give 155.1 g 1,3,5,7-tetramethyl-1,3,5,7-tetra(tert-butylaminopropyl)cyclo-tetrasiloxane. The yield of this siloxane was 70%. A carboxylate bond-containing reaction product was prepared by mixing 40.4 g unsaturated fatty acid (tradename: Hi-Diene, from KF Trading Company, neutralization value=200, conjugated linoleic acid content=56.5%) into 100 g of this siloxane.

REFERENCE EXAMPLE 2

118.4 g of the following amino-functional dimethoxysilane

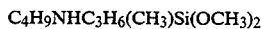

was introduced into a 1 L flask equipped with stirrer, reflux condenser, thermometer, and addition funnel. 21.4 g water was then slowly dripped in from the addition funnel while stirring in order to hydrolyze the methoxy group. After hydrolysis the low boilers were distilled off in a vacuum to yield 92.7 g hydrolyzate with a viscosity of 0.24 Pa.s at room temperature. 58 g of this hydrolyzate, 26.6 g polydimethylsiloxane (viscosity=0.01 Pa.s expressed by the following formula

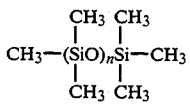

where n has a value that yields a viscosity of 0.01 Pa.s, and 607 g octamethylcyclotetrasiloxane were introduced into a 2 L flask equipped with stirrer, reflux condenser, thermometer, and addition funnel. 0.138 g potassium hydroxide was added as equilibration-polymerization catalyst, and the temperature was slowly raised to 150° C. After running equilibration polymerization at this temperature, 0.177 g acetic acid was introduced in order to neutralize the equilibration-polymerization catalyst. Subsequent distillation of the low boilers in a vacuum yielded 472 g of a polydiorganosiloxane (viscosity=1.463 Pa.s) bearing the n-butylaminopropyl group in non-terminal position. This polydiorganosiloxane contained 3.6 weight % amino-containing organic group with the formula $C_4H_9NH-$. 100 g of this polydiorganosiloxane and 14 g soy oil fatty acids were introduced into a 0.3 L four-neck flask fitted with a distillation tube-equipped reflux condenser, stirrer, nitrogen inlet tube, and thermometer. After the introduction of a small amount of toluene to set up the azeotrope, the temperature was gradually raised under a nitrogen current. The reaction was run while holding the temperature in the flask at 150° C. to 160° C. and removing the water of condensation by azeotropic dehydration. After the reaction, the low-boiling material (e.g., toluene, etc.) was removed by distillation to yield a reaction product in the form of a transparent brown liquid. When this reaction product was subjected to infrared spectroscopic analysis, it was found that the characteristic absorption at 1700 cm$^{-1}$ originating in the carbonyl of the soy oil fatty acids had disappeared and that the characteristic absorption at 1620 cm$^{-1}$ originating in the amide group had appeared. This confirmed completion of the amidation reaction.

REFERENCE EXAMPLE 3

95.1 g allyl glycidyl ether, 57.6 g toluene, and 0.03 g 1% tetrahydrofuran solution of chloroplatinic acid were introduced into a 0.5 L flask equipped with a stirrer, reflux condenser, thermometer, and addition funnel, and the temperature was gradually raised to 80° C. while stirring. 97.3 g dimethylsiloxane-methylhydrogensiloxane copolymer with the following formula

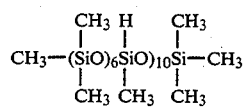

was then gradually dripped in from the addition funnel at the same temperature. After the completion of addition the temperature was gradually raised to 115° C. At this point, periodic sampling of the reaction mixture was begun, and the samples were submitted to infrared spectroscopic analysis: the reaction was continued until the characteristic absorption originating in the silicon-bonded hydrogen atom was no longer observed. After the reaction the low boilers (e.g., toluene and unreacted allyl glycidyl ether) were distilled off to yield a polydiorganosiloxane carrying the epoxy-functional organic group with the following formula in non-terminal position.

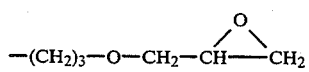

This polydiorganosiloxane had an epoxy group content of 18.9 weight %. 50 g of this polydiorganosiloxane, 123 g soy oil fatty acids, and a small amount of xylene were introduced into a 0.3 L flask fitted with a stirrer, distillation tube-equipped reflux condenser, and thermometer, and the temperature was gradually raised to 230° C. After running an esterification reaction at this temperature, cooling afforded an ester bond-containing reaction product.

EXAMPLE 1

The following were mixed under essentially anhydrous conditions to give a room-temperature-curable organopolysiloxane composition: 100 g silanol-endblocked polydimethylsiloxane with a viscosity of 20 Pa.s, 100 g colloidal calcium carbonate (average particle size=0.1 micron) whose surface had been treated with fatty acid, 10 g of the carboxylate bond-containing reaction product from Reference Example 1, and 20 g vinyltris(methylethylketoximo)silane. This composition was submitted to measurement of its paint coatability, paint adherence, stain resistance, and physical properties, and these results were as reported in Table 1.

EXAMPLE 2

The following were mixed under essentially anhydrous conditions to give a room-temperature-curable organopolysiloxane composition: 100 g silanol-endblocked polydimethylsiloxane with a viscosity of 20 Pa.s, 100 g colloidal calcium carbonate (average particle size=0.1 micron) whose surface had been treated with fatty acid, 40 g of the amide bond-containing reaction product from Reference Example 2, and 20 g vinyltris(methylethylketoximo)silane. This composition was submitted to measurement of its paint coatability, paint adherence, stain resistance, and physical properties, and these results were as reported in Table 1.

EXAMPLE 3

The following were mixed under essentially anhydrous conditions to give a room-temperature-curable organopolysiloxane composition: 100 g silanol-endblocked polydimethylsiloxane with a viscosity of 20 Pa.s, 100 g colloidal calcium carbonate (average particle size=0.1 micron) whose surface had been treated with fatty acid, 10 g of the ester bond-containing reaction product from Reference Example 3, and 20 g vinyltris(methylethylketoximo)silane. This composition was submitted to measurement of its paint coatability, paint adherence, stain resistance, and physical properties, and these results were as reported in Table 1.

COMPARISON EXAMPLE 1

The following were mixed under essentially anhydrous conditions to give a room-temperature-curable organopolysiloxane composition: 100 g silanol-endblocked polydimethylsiloxane with a viscosity of 20 Pa.s, 100 g colloidal calcium carbonate (average particle size=0.1 micron) whose surface had been treated with fatty acid, and 20 g vinyltris(methylethylketoximo)silane. This composition was submitted to measurement of its paint coatability, paint adherence, stain resistance, and physical properties, and these results were as reported in Table 1.

TABLE 1

| | Example 1 | Example 2 | Example 3 | Comparison Example 1 |
|---|---|---|---|---|
| Paint Coatability | | | | |
| paint A | ++ | ++ | ++ | x |
| paint B | ++ | ++ | ++ | + |
| Paint Adherence | | | | |
| paint A | ++ | ++ | ++ | x |
| paint B | ++ | ++ | ++ | x |
| Stain Resistance | | | | |
| rubber surface | ++ | ++ | ++ | x |
| adjacent surface to the joint | ++ | ++ | ++ | x |
| Physical Properties | | | | |
| hardness | 27 | 25 | 24 | 29 |
| elongation (%) | 250 | 270 | 260 | 300 |
| tensile strength, kPa | 784.5 | 686.5 | 686.5 | 882.6 |

EFFECTS OF THE INVENTION

Because the room-temperature-curable organopolysiloxane composition of the present invention is comprised of components (A)–(C) as described above, and in particular because it contains the polydiorganosiloxane/unsaturated fatty acid reaction product of component (C), it is characterized by a facile paint coatability of the surface of the cured rubber, by the fact that the resulting paint film does not delaminate readily, and by freedom from staining of the surface of the cured rubber and substrates adjacent to the rubber.

That which is claimed is:

1. A room-temperature-curable organopolysiloxane composition comprising
   (A) 100 weight parts essentially linear organopolysiloxane that has a silanol group or a silicon-bonded hydrolyzable group at its molecular chain terminals and has a viscosity at 25° C. of from 0.1 to 1,000 Pa.s,
   (B) 0.1 to 40 weight parts silicon-containing crosslinker having at least two silicon-bonded hydrolyzable groups per molecule, and
   (C) 0.1 to 200 weight parts of a reaction product from an unsaturated fatty acid containing at least 3 carbons and polydiorganosiloxane that contains in each molecule at least 1 silicon-bonded organic group selected from the group consisting of amino-functional organic groups and epoxy-functional organic groups.

2. The room-temperature-curable organopolysiloxane composition in accordance with claim 1 in which the polydiorganosiloxane of (A) has a viscosity measured at 25° C. of from 1 to 100 Pa.s.

3. The room-temperature-curable organopolysiloxane composition in accordance with claim 1 in which (C) has a viscosity measured at 25° C. of from 0.005 to 15 Pa.s.

4. The room-temperature-curable organopolysiloxane composition in accordance with claim 1 further comprising a filler.

5. The room-temperature-curable organopolysiloxane composition in accordance with claim 2 further comprising a filler.

6. The room-temperature-curable organopolysiloxane composition in accordance with claim 3 further comprising a filler.

7. The room-temperature-curable organopolysiloxane composition in accordance with claim 1 in which (B) is present in an amount of from 1 to 20 weight parts.

8. The room-temperature-curable organopolysiloxane composition in accordance with claim 2 in which (B) is present in an amount of from 1 to 20 weight parts.

9. The room-temperature-curable organopolysiloxane composition in accordance with claim 3 in which (B) is present in an amount of from 1 to 20 weight parts.

10. The room-temperature-curable organopolysiloxane composition in accordance with claim 4 in which (B) is present in an amount of from 1 to 20 weight parts and the filler is present in an amount of from 5 to 150 weight parts.

11. The room-temperature-curable organopolysiloxane composition in accordance with claim 5 in which (B) is present in an amount of from 1 to 20 weight parts and the filler is present in an amount of from 5 to 150 weight parts.

12. The room-temperature-curable organopolysiloxane composition in accordance with claim 6 in which (B) is present in an amount of from 1 to 20 weight parts and the filler is present in an amount of from 5 to 150 weight parts.

13. The room-temperature-curable organopolysiloxane composition in accordance with claim 1 in which the viscosity measured for (A) is from 1 to 100 Pa.s, (B) is present in an amount of from 1 to 20 weight parts, (C) is present in an amount of from 5 to 50 weight parts, (C) has a viscosity measured at 25° C. of from 0.005 to 15

Pa.s and 70 percent of the organo radicals are methyl and the unsaturated fatty acid contains at least 10 carbon atoms.

14. The room-temperature-curable organopolysiloxane composition in accordance with claim 13 further comprising a filler in the amount of from 5 to 150 weight parts.

15. The room-temperature-curable organopolysiloxane composition in accordance with claim 1 further comprising a catalyst for curing the composition.

16. The room-temperature-curable organopolysiloxane composition in accordance with claim 13 further comprising a catalyst for curing the composition.

17. The room-temperature-curable organopolysiloxane composition in accordance with claim 15 further comprising a catalyst for curing the composition.

* * * * *